DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 6

T952,002

PARTIAL PURIFICATION OF WET-PROCESS PHOSPHORIC ACID WITH ACETONE AND AMMONIA

Henry K. Walters, Jr., Yong K. Kim, and John D. Hatfield, Florence, Ala., assignors to Tennessee Valley Authority

Filed Aug. 29, 1975, Ser. No. 608,834
Int. Cl.[2] C01B *25/16;* C05B *7/00*
U.S. Cl. 71—34
1 Sheet Drawing. 13 Pages Specification

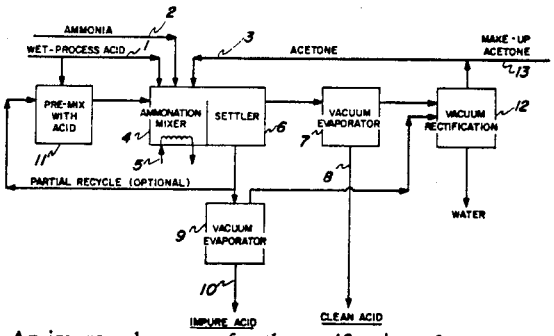

An improved process for the purification of wet process acid (hereinafter referred to as WPPA) with acetone and ammonia. The WPPA is partially ammoniated and mixed with acetone to separate most of the metallic and anionic impurities in a rapidly separable bottom liquid layer and the purified acid in the top layer. The top clear layer contains about 75 percent of the acid, nearly all the acetone, and a small fraction of the impurities; and the bottom layer contains the remainder of the materials. The acetone is recovered from the two layers by distillation thereby yielding the purified acid and an impure acid suitable for fertilizer manufacture.

The optimum ranges of ammonia and acetone to give good purification are from about 0.2 to 0.6 mole of ammonia per mole of $P_2O_5$ in the WPPA, and from one to 5 pounds of acetone per pound of WPPA. WPPA containing $P_2O_5$ ranging from about 25 to about 55 weight percent is easily purified in this improved batch or continuous process. Only about 3 minutes of mixing of the acetone with the ammoniated acid are required and about one minute is usually required for a clean separation of the two liquid layers.

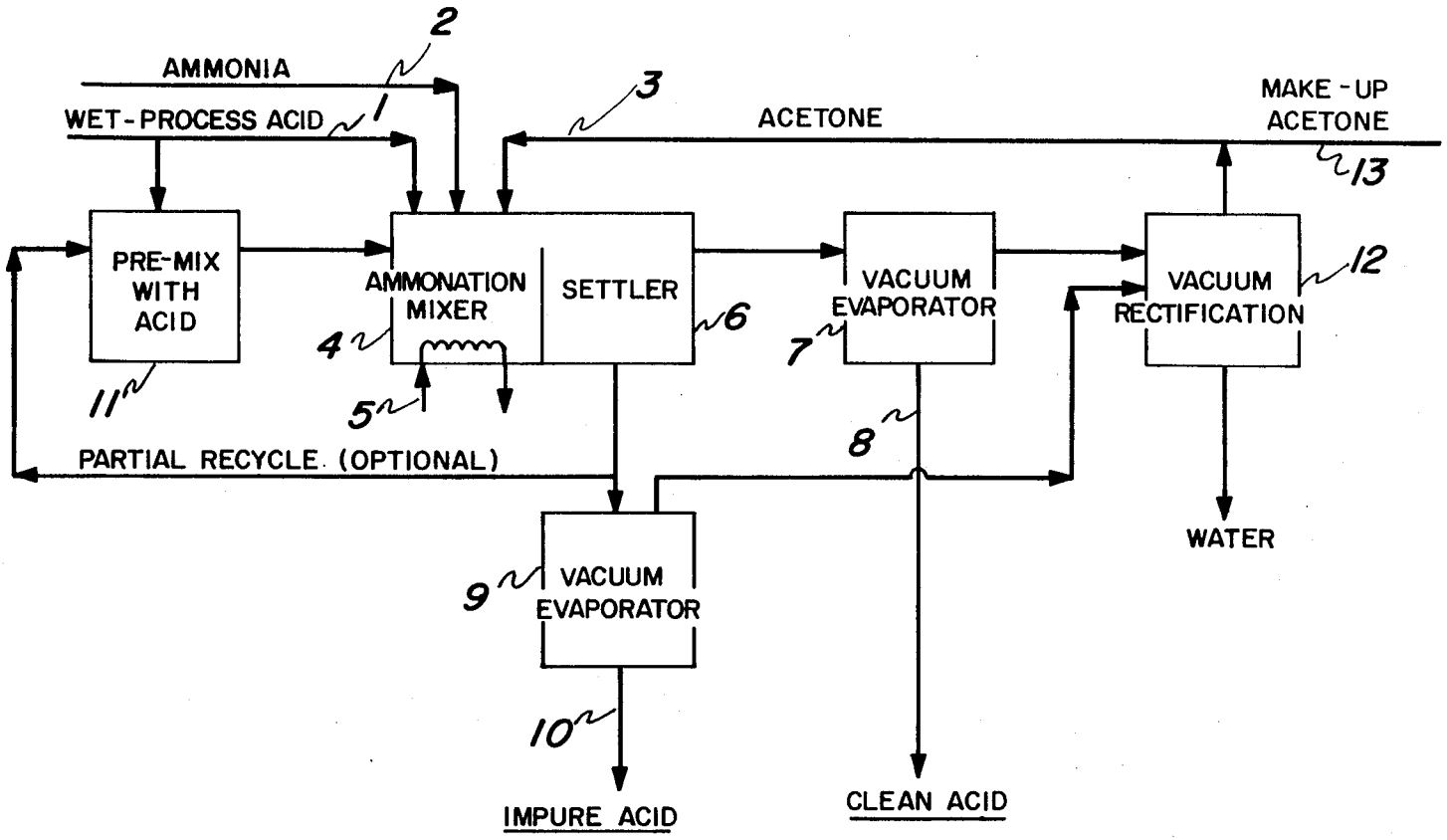

PARTIAL PURIFICATION OF
WET-PROCESS PHOSPHORIC ACID WITH
ACETONE AND AMMONIA
Original Filed Aug. 29, 1975